March 14, 1939. W. B. EWING 2,150,651
RAILING AND MANUFACTURE THEREOF
Filed May 18, 1935 3 Sheets-Sheet 1
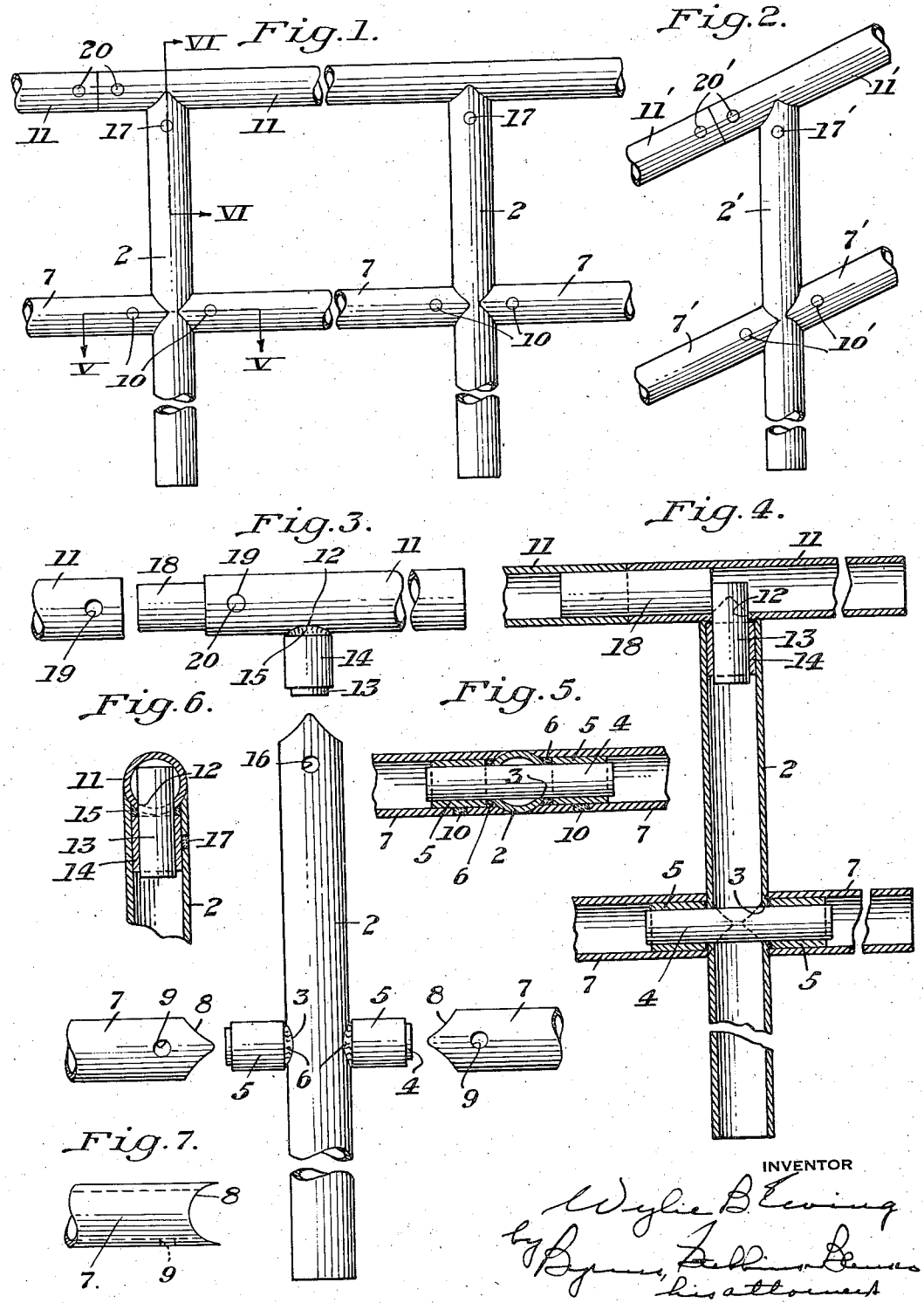

March 14, 1939. W. B. EWING 2,150,651
RAILING AND MANUFACTURE THEREOF
Filed May 18, 1935 3 Sheets-Sheet 2
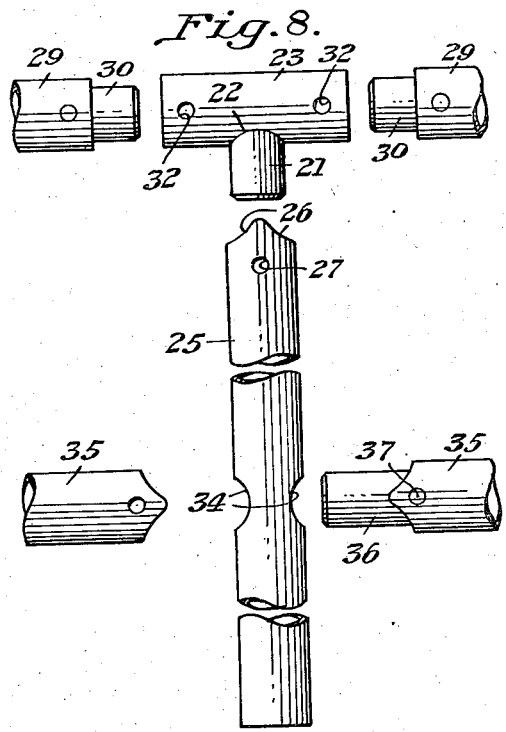
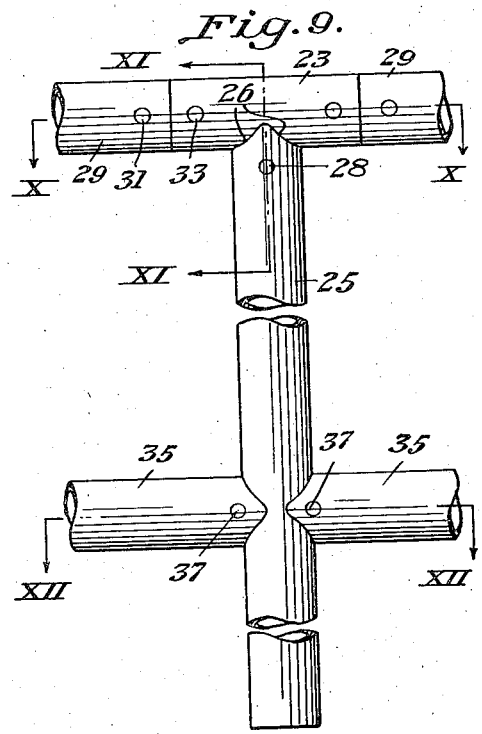
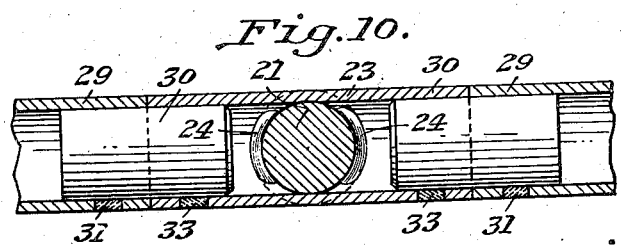
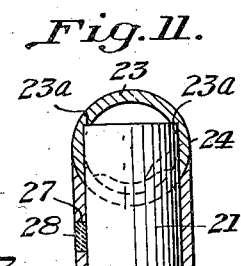
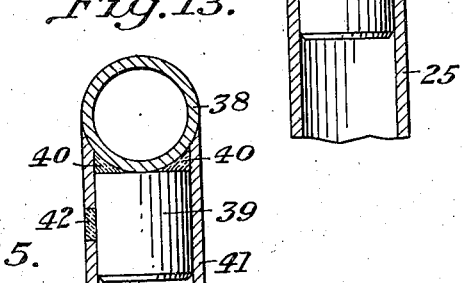
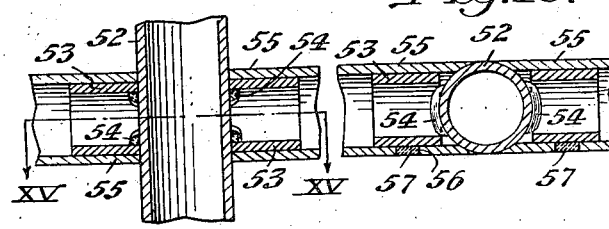
INVENTOR March 14, 1939.  W. B. EWING  2,150,651
RAILING AND MANUFACTURE THEREOF
Filed May 18, 1935   3 Sheets-Sheet 3
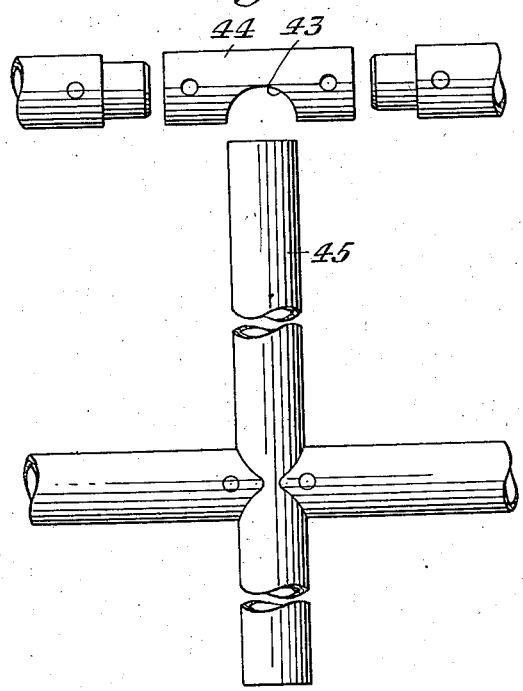
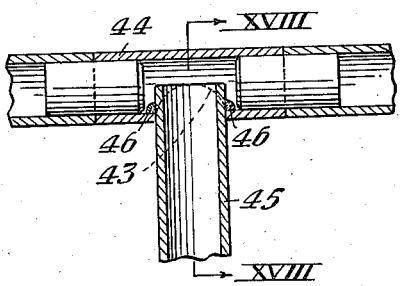
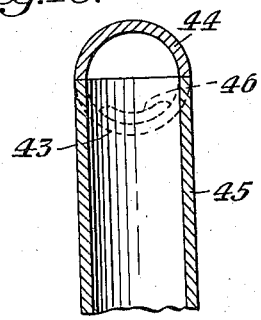
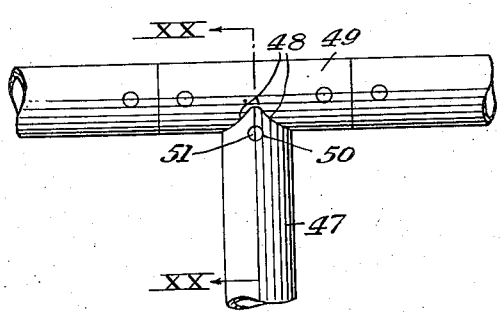
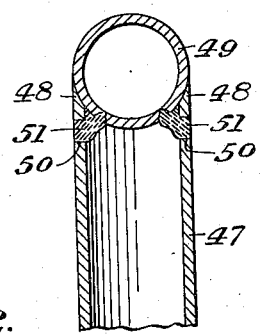
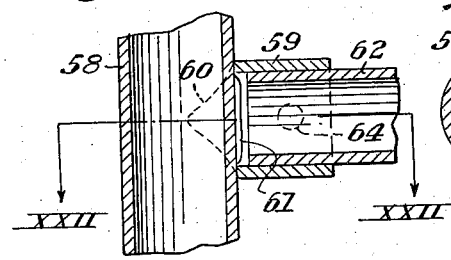
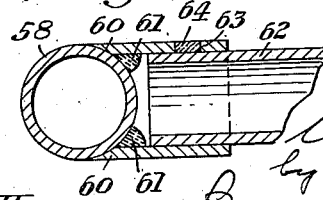
INVENTOR Patented Mar. 14, 1939

2,150,651

UNITED STATES PATENT OFFICE 2,150,651

RAILING AND MANUFACTURE THEREOF

Wylie B. Ewing, Wheeling, W. Va., assignor, by mesne assignments, to Vulcan Rail and Construction Company, Maspeth, N. Y., a corporation of New York Application May 18, 1935, Serial No. 22,236

12 Claims. (Cl. 29—148.2)

This invention relates broadly to railing and the manufacture thereof. It relates more particularly to railing comprising composite tubular structures primarily adapted for structural uses, such, for example, as hand railing, guard railing and the like. The invention further relates to certain improved methods of manufacturing railing, and particularly railing made up of pipe or tubular material, and to certain novel features of structures of such character.

Purely for the purposes of illustration and explanation the invention will be described in connection with the manufacture of hand railing such as is used for bridges, sidewalks, etc. The present invention is along the same general lines as the invention described and claimed in my copending application Serial No. 751,717, filed November 6, 1934, now Patent 2,101,707, December 7, 1937, but constitutes an improvement thereover in certain respects. I find that it is not necessary to use any threaded joints in a railing of the type covered by my said copending application, and I also provide for maintaining the exterior of the railing of substantially constant diameter and unbroken by relatively large fitting portions at the joints.

My railing according to the present invention embodies various improvements resulting primarily in reduction of cost and ease of assembly. The entire railing may be fabricated in the field, only cutting and welding equipment being necessary. My railing in its preferred form has no threaded joints, all the joints preferably being welded. I find it advantageous to employ button welds at the joints and then to grind off the surfaces thereof flush with the outer surface of the railing. In certain cases the welding is disposed internally of the pipe so that it is invisible from without and need not be ground.

Centering members may or may not be used at the joints. In certain cases the use of centering members is particularly desirable, such as at joints between two axially aligned abutting pipes. Intersecting pipes may be welded together without centering members, although in many cases the use of centering members will be found highly desirable. Such members strengthen the structure and facilitate assembly of the pipes in proper cooperative relation. I preferably utilize long top rail sections supported by a number of pipe uprights and welded thereto internally of the railing.

Other details, objects and advantages of the invention will become apparent as the following description of certain present preferred embodiments thereof proceeds.

In the accompanying drawings I have shown certain present preferred embodiments of the invention, in which Figure 1 is an elevational view of part of a railing with portions cut away;

Figure 2 is an elevational view of part of a railing of somewhat different form with a portion cut away;

Figure 3 is an exploded elevational view to enlarged scale and with portions cut away of part of the railing shown in Figure 1;

Figure 4 is a central vertical longitudinal cross-sectional view to enlarged scale and with portions cut away of part of the railing shown in Figure 1;

Figure 5 is a horizontal longitudinal cross-sectional view to enlarged scale taken on the line V—V of Figure 1;

Figure 6 is a vertical transverse cross-sectional view to enlarged scale taken on the line VI—VI of Figure 1;

Figure 7 is a plan view of the left-hand lower rail portion shown in Figure 3;

Figure 8 is an exploded elevational view similar to Figure 3 showing a modified form;

Figure 9 is an elevational view similar to Figure 1 of the form of structure shown in Figure 8;

Figure 10 is a horizontal longitudinal cross-sectional view to enlarged scale taken on the line X—X of Figure 9;

Figure 11 is a vertical transverse cross-sectional view to enlarged scale taken on the line XI—XI of Figure 9;

Figure 12 is a horizontal longitudinal cross-sectional view to enlarged scale taken on the line XII—XII of Figure 9;

Figure 13 is a vertical transverse cross-sectional view similar to Figure 11 showing a modified form;

Figure 14 is a central vertical longitudinal cross-sectional view showing a further modified form;

Figure 15 is a horizontal longitudinal cross-sectional view taken on the line XV—XV of Figure 14;

Figure 16 is an exploded elevational view similar to Figure 8 showing a modified form;

Figure 17 is a central vertical longitudinal cross-sectional view through a portion of the structure shown in Figure 16 when assembled;

Figure 18 is a vertical transverse cross-sectional view taken on the line XVIII—XVIII of Figure 17;

Figure 19 is a fragmentary elevational view of a further modified form;

Figure 20 is a vertical transverse cross-sectional view to enlarged scale taken on the line XX—XX of Figure 19;

Figure 21 is a central vertical longitudinal cross-sectional view showing a further modified form; and Figure 22 is a horizontal longitudinal cross-sectional view taken on the line XXII—XXII of Figure 1.

Referring now more particularly to the form of structure shown in Figures 1, 3, 4, 5, 6 and 7, there are provided posts or uprights in the form of pipes 2, each of which has a transverse hole 3 formed through it intermediate its ends. A pin 4 is inserted through the hole 3 and is positioned so as to project from both sides of the upright. A collar 5 is slipped over each end of the pin 4 and the pin 4 and collars 5 are welded together and to the upright by welding 6 which is disposed within the extended peripheries of the collars 5. This forms a strong integral cross-shaped structure without any outward projections extending beyond the surfaces of the collars 5. Lower rail members in the form of pipes 7 having their inner ends shaped as shown at 8 to snugly embrace the outside of the upright 2 and whose internal diameters are such that they will slide over the sleeves 5 and be positively guided and positioned by such sleeves are slid over such sleeves and assembled with the composite structure above described as shown in Figure 1. Each of the lower rail members 7 has a hole 9 therethrough and when such members are in place over the sleeves 5 and in contact with the upright 2 they are button welded to the sleeves through the holes 9, as shown at 10, and the excess welding at the peripheries of the lower rail members 7 may be ground off, leaving a perfectly smooth structure of uniform external diameter.

A top rail made up of sections 11 is provided, each section preferably being relatively long and being supported by a number of the posts or uprights 2 spaced therealong and having a hole 12 formed through one side only of the wall thereof in axial alignment with each post and receiving a pin 13. A sleeve 14 is slid over the pin 13 and the pin and sleeve are welded to each other and to the top rail section 11 by welding 15, which is within the extended periphery of the sleeve 14. The top of the upright 2 is shaped to be slipped over the sleeve 14 and to snugly embrace the top rail section 11, as shown in Figure 1. It is provided near its upper end with a hole 16 through which when in place it is button welded to the sleeve 14 at 17.

A plug 18 is slipped into the adjacent ends of the upper rail sections 11, each of which is provided with a hole 19, and such upper rail sections are pushed into endwise abutment with the pin 18 in place and each is button welded to the pin at 20. The pin 18 is prevented from sliding longitudinally by abutting against the pin 13, as shown in Figure 4, the pin 18 first being inserted into the right-hand rail section and the left-hand rail section then being slid over the left-hand end of the pin. This insures a strong joint as the pin 18 cannot become displaced.

The form shown in Figure 2 is substantially the same as that shown in Figure 1 except that the upper and lower rails are inclined at an angle of less than 90° to the uprights. A structure such as that of Figure 2 could be used as a railing in connection with stairs and inclines. The parts shown in Figure 2 corresponding to the parts of Figure 1 are designated by the same reference numerals each with a prime affixed.

Turning now to the form shown in Figures 8 to 12, inclusive, this form is simpler than that just described in that the sleeves are omitted. The joints are made with pins alone. A pin 21 is inserted into a hole 22 in the bottom of a horizontally extending pipe member 23 and is welded thereto internally as shown at 24 in Figure 11. Preferably the tool forming the hole 22 is operated so as to cut into the upper portion of the wall of the pipe member 23, as shown at 23a, to form a seat for the top of the pin 21. This results in an extremely strong and rigid structure. The upright 25 has its top shaped as at 26 to embrace the member 23 and to be slid over and guided and positioned by the pin 21. It is provided with a hole 27 through which it is button welded to the pin 21 at 28. Each of the top rail members 29 has a pin 30 projecting from its end and button welded thereto at 31 and the composite structure thus formed is moved into assembled relationship with the member 23, the extremity of each pin 30 entering an open end of the member 23 until each of the members 29 abuts the member 23 when the member 23 is button welded to each of the pins 30 through a hole 32, the welding being shown at 33 in Figure 10.

The upright 25 has a hole 34 formed transversely through it intermediate its ends and lower rail members 35, one of which has a centering pin 36 button welded thereto at 37, as shown in Figure 8, are assembled with the upright, the pin 36 passing completely through the hole 34 and within the left-hand member 35 which is button welded to it at 37. This structure is very strong and exceptionally easy to fabricate in the field.

Figure 13 shows a modification of the joint between the upright and the top rail. In this form the top rail 38 is unbroken, a pin 39 simply being abutted against the under surface thereof and welded thereto by welding 40 disposed within the extended periphery of the pin 39. The upright 41 is slipped in place over the pin 39 and embraces the top rail as in the form of Figure 9 and is button welded to the pin 39 at 42. This is a still simpler form eliminating the necessity of forming any hole in the upper rail. The same principle may be employed at other points in the railing, as, for example, at the junction between the upright and the lower rails.

Figures 14 and 15 show a modified form of structure including an upright 52 which is unbroken and which has welded thereto at opposite sides internal centering sleeves 53. The welding is shown at 54 as being disposed for the most part internally of the sleeves, but if desired the welding may be disposed at the inner ends of the sleeves and within the extended peripheries thereof similar to the form shown in Figure 13. In any event, the welding is preferably done in such manner that no welding material extends outwardly perpendicular to the axis of the sleeves 53 beyond the peripheries or extended peripheries thereof. The sleeves may, if desired, be shaped to snugly embrace the post 52, which produces a somewhat stronger joint. Rail members 55 are slid over the respective sleeves, the ends of the rail members being shaped to closely embrace the post 52, and each rail member is provided with a hole 56 through which it is button welded to the corresponding sleeve as at 57.

Figures 16, 17 and 18 show a modified form of structure particularly where the upright is connected with the top rail. A hole 43 is formed in the wall of the top rail 44, the axis of the hole and the axis of the tool forming it intersecting the axis of the member 44, and the diameter of the hole being substantially equal to the diameter of the member 44. The hole extends exactly half way through the member 44. The top of the upright 45 is then inserted into the hole 43, it being understood that the external diameter of the upright 45 is the same as the external diameter of the member 44 and the same as the diameter of the hole 43, although, of course, sufficient clearance is provided to enable insertion of the top of the upright into the hole. The upright is inserted to the position shown in Figures 17 and 18, forming a smooth joint, and the joint is welded internally as shown at 46. The other connections may be made in one of the manners previously described.

A still simpler form is shown in Figures 19 and 20 in which not even a centering pin is used. In this form the top of the upright 47 is shaped at 48 to embrace a portion of the upper rail 49, but the upper rail is unbroken. Holes 50 are provided at the opposite sides of the upright 47 and when the upright and top rail member 49 are assembled they are welded together through the holes 50 by welding 51 as shown in Figure 20. The excess welding is ground off at the face of the upright, the joint having the same appearance after being finished as those of Figures 1, 9 and 13. A similar type of assembly may be used at the intersection of the upright and lower rails. This avoids entirely the use of centering members, although in order to properly position and align respective parts of the railing before welding it may be desirable to use a jig or other suitable positioning device.

A further form of joint is shown in Figures 21 and 22 in which there is provided an upright or post 58 which is unbroken and which has welded thereto an external centering sleeve 59 which may be of substantially the same external diameter as the post. The inner end of the centering sleeve is shaped as shown at 60 to conform to and closely embrace the surface of the post 58 and the external diameter of the sleeve may be substantially the same as that of the post. The sleeve is welded to the post internally of the sleeve as shown at 61. A rail member 62 is slid into the sleeve 59 after the same has been welded to the post 58, the rail member being of such external diameter as to fit snugly within the sleeve so as to be positively positioned and guided thereby. The sleeve is provided with a hole 63 through which it is button welded to the rail member as at 64.

It will be realized that the various forms of joint shown in the drawings may in many cases be used in various positions, that is to say, the vertically extending member or members may, for example, extend horizontally or at an acute angle to the horizontal, and the horizontally extending member or members may extend vertically or at an acute angle to the vertical. Also, forms in which connections are made at opposite sides of a central member are equally applicable for a connection at one side only and other forms which show a connection at one side only are equally applicable for connection at opposite sides or at more than two points about the periphery of the central member. In my copending application Serial No. 44,721, filed October 12, 1935, I have disclosed and claimed a method of and apparatus for forming holes in pipe and the like, which method and apparatus are particularly adaptable for use in forming holes in pipe to be used for constructing railing.

The word "pipe" is used herein as a word of broad definition and not of limitation and this word is to be construed to mean any structural element suitable for my purpose. Similarly where in the specification and claims reference is made to welding the pipes and centering members together this does not necessarily mean that each of the members is directly welded to each of the others, so long as the assembly is maintained by welding.

While I have shown and described certain present preferred embodiments of the invention and certain present preferred methods of practicing the same, it is to be distinctly understood that the same is not limited thereto but may be otherwise variously embodied and practiced within the scope of the following claims.

I claim:

1. A method of making railing, comprising introducing a centering member through the wall of a pipe, welding the centering member to the pipe externally of the pipe, assembling in centered relation with said centering member a second pipe, covering the welding between the centering member and the first mentioned pipe by the second pipe, and fastening said second pipe and centering member together.

2. A method of making railing, comprising introducing a centering member through the wall of a pipe, fastening said centering member in place with respect to the pipe, assembling in centered relation with said centering member a second pipe, covering the fastening between the centering member and the first mentioned pipe by the second pipe, and fastening said second pipe in place with respect to said centering member.

3. A method of making railing, comprising introducing a centering member through the wall of a pipe, passing a sleeve about said centering member, welding together said pipe, centering member and sleeve within the extended periphery of the sleeve, passing a second pipe about said sleeve, and fastening said second pipe and sleeve together.

4. A method of making railing, comprising assembling with a pipe and so as to project transversely therefrom a centering member, assembling in centered relation with said centering member a second pipe, providing a hole through the wall of the outer of the second pipe and centering member, and welding together the second pipe and centering member through said hole.

5. A method of making railing, comprising abutting the end of a centering member against the wall of a pipe, welding the same together within the extended periphery of the centering member, passing the end of a second pipe about the centering member, and welding together the second pipe and centering member.

6. Railing structure, comprising a pipe, a centering member of substantially uniform cross-section throughout extending through the wall of the pipe, a sleeve about the centering member, means fastening together said pipe, centering member and sleeve, a second pipe about said sleeve, and means fastening together said second pipe and sleeve.

7. Railing structure, comprising a pipe, a centering member projecting transversely therefrom, and a second pipe disposed in centered relation with the centering member, the outer of the second pipe and centering member having a hole through the wall thereof, the second pipe and centering member being welded together through said hole.

8. Railing structure, comprising a pipe, a centering member abutting against the wall of said pipe, the centering member and pipe being welded together within the extended periphery of the centering member, and a second pipe disposed about the centering member, the second pipe and centering member being welded together.

9. Railing structure, comprising a pipe having a hole formed through the wall thereof and a recess in the inner surface of the pipe wall in alignment with said hole and another pipe extending through said hole and having its end seated in said recess.

10. Railing structure, comprising a pipe, a centering sleeve whose axis extends transversely of the pipe welded to the pipe, and a second pipe having its end within said sleeve and welded thereto.

11. Railing structure, comprising a pipe, a centering sleeve having an end shaped to conform to the exterior of the pipe welded to the pipe internally of the sleeve, and a second pipe having its end within said sleeve and welded thereto within the confines thereof.

12. A method of making railing, comprising providing a tubular railing member, making an opening through the wall of said tubular railing member, providing a second railing member of such size as to enter said first mentioned member at an end thereof, inserting a portion of said second mentioned member into an end of said first mentioned member and so that a portion of said second mentioned member is in alignment with the opening in the wall of the first mentioned member, and through said opening welding said members together.

WYLIE B. EWING.